(12) United States Patent
Gloeckler et al.

(10) Patent No.: US 7,442,361 B1
(45) Date of Patent: Oct. 28, 2008

(54) METHOD OF PRODUCING ALUMINUM HYDROXIDES BY PRECIPITATING ALUMINUM SALTS IN THE PRESENCE OF SEED CRYSTALS

(75) Inventors: Rainer Gloeckler, Brunsbuettel (DE); Arnold Meyer, St. Michaelisdonn (DE)

(73) Assignee: Sasol Germany GmbH, Hamburg (DE)

( * ) Notice: Subject to any disclaimer, the term of this patent is extended or adjusted under 35 U.S.C. 154(b) by 333 days.

(21) Appl. No.: 10/019,795

(22) PCT Filed: Jul. 5, 2000

(86) PCT No.: PCT/DE00/02138

§ 371 (c)(1),
(2), (4) Date: Apr. 2, 2002

(87) PCT Pub. No.: WO01/02297

PCT Pub. Date: Jan. 11, 2001

(30) Foreign Application Priority Data

Jul. 6, 1999  (DE) ................. 199 30 924

(51) Int. Cl.
*C01F 7/02* (2006.01)
(52) U.S. Cl. ..................... 423/628; 423/625
(58) Field of Classification Search ............ 423/628, 423/625
See application file for complete search history.

(56) References Cited

U.S. PATENT DOCUMENTS

| 3,322,494 | A | * | 5/1967 | Magee et al. ............ 423/628 |
| 3,361,526 | A | * | 1/1968 | Magee et al. ............ 423/628 |
| 3,630,670 | A | | 12/1971 | Bell et al. |
| 4,154,812 | A | | 5/1979 | Sanchez et al. |
| 4,797,139 | A | * | 1/1989 | Bauer ....................... 51/293 |
| 5,055,019 | A | | 10/1991 | Meyer et al. |
| 5,800,797 | A | | 9/1998 | Matsumoto et al. |
| 6,030,599 | A | | 2/2000 | Noweck et al. |
| 6,048,470 | A | | 4/2000 | Nakahara et al. |
| 6,174,511 | B1 | | 1/2001 | Tsukada et al. |

FOREIGN PATENT DOCUMENTS

EP 0602900 3/1997

OTHER PUBLICATIONS

N.G. Papayannakos, A.M. Thanos, and V.E. Kaloidas, Effect of Seeding During Precursor Preparation on the Pore Structure of Alumina Catalyst Supports, *Microporous Materials*, I, 1993, pp. 413-422, no month.

* cited by examiner

*Primary Examiner*—Steven Bos
(74) *Attorney, Agent, or Firm*—Browning Bushman P.C.

(57) ABSTRACT

The invention relates to a procedure for manufacturing alumina hydrates by precipitating aluminum salts in the presence of crystal nuclei of a specific size.

11 Claims, No Drawings

METHOD OF PRODUCING ALUMINUM HYDROXIDES BY PRECIPITATING ALUMINUM SALTS IN THE PRESENCE OF SEED CRYSTALS

BACKGROUND OF THE INVENTION

1. Field of the Invention

The invention relates to a method for producing alumina hydrates by precipitating aluminum salts in the presence of crystal nuclei of a specific size.

2. Description of the Prior Art

Known in the art are procedures for manufacturing boehmitic alumina or alpha-aluminum oxide monohydrates by neutralizing basic aluminate solutions, e.g., with sulfuric acid or acidic aluminum salt solutions. In this case, the alumina hydrates are generally precipitated at a pH value of between 4.5 and 7. However, the literature also describes procedures in which the alumina hydrates are precipitated at a pH of 7 to 10.

The use of crystal nuclei during the precipitation of alumina is also known. In the procedure described in DE 21 25 625-C2, a sodium aluminate solution is reacted with nitric acid in a first boiler, precipitated in a second boiler, wherein a partial flow is removed from the latter and routed to the first boiler. According to the procedure described in DE 21 25 625-C2, pore volumes of up to 0.33 cm$^3$/g are obtainable.

U.S. Pat. No. 4,154,812 describes a procedure for the manufacture of alumina hydrates that involves 5 phases:

1. Formation of crystal nuclei from an aqueous aluminum salt solution by adding aluminum sulfate in water and setting a pH of 2 to 5.
2. Precipitation of the boehmitic alumina by setting a pH value of between 7 and 8 via the simultaneous addition of basic aluminate and acidic aluminum salt solutions.
3. Setting of a pH value of between 9.5 and 10.5 by adding a corresponding quantity of aluminate solution.
4. Repeated stirring of the alumina suspension.
5. Filtration of the suspension and washing of the filter cake.

The procedure according to U.S. Pat. No. 4,154,812 is characterized by the observance of defined pH values and temperatures (54 to 82° C.) during specific phases of the reaction.

The boehmitic alumina obtainable according to this procedure exhibit a pore volume (0-60 nm) of less than or equal to 0.82 ml/g after an activation (400° C. for 30 minutes). These products exhibit 0.02% w/w Na$_2$O and 0.2% w/w sulfate relative to 72.5% w/w Al$_2$O$_3$ as the primary contaminants. U.S. Pat. No. 4,154,812 describes the porosity of the boehmitic alumina as being influenced by the pH value, concentration and temperature. At the arising pH value of 2 to 5, or 3 to 4, partial hydrolysis of the acidic aluminum salt produces boehmitic alumina in the form of crystals given a high dilution and a temperature of 140 to 170° F. These crystals act as nuclei during the subsequent precipitation. Obtained in this way are boehmitic silica that exhibit pore volumes of 0.8 to 0.9 ml/g.

U.S. Pat. No. 4,248,852 describes a procedure for manufacturing γ-alumina with a high pore volume. According to this publication, aluminum salts and aluminates are reacted in such a way that several reaction phases with respectively different pH values (pH-swing) must be traversed.

SUMMARY OF THE INVENTION

The object of this invention is to manufacture alumina hydrates with crystalline sizes of 3 to 5 nm and pore volumes exceeding 1.0 ml/g, preferably exceeding 1.25 ml/g, especially preferred exceeding 1.6 ml/g by neutralizing basic aluminate solutions. The object of the invention is also to provide a procedure that makes it possible to generate products with an adjustable pore radius distribution, pore size and specific surface. In addition, the procedure according to the invention must be easy to execute, and not involve the complicated sequence of varying procedural steps known from prior art.

DESCRIPTION OF THE PREFERRED EMBODIMENTS

It was surprisingly shown that adding inorganic and organic particles, whose average particle sizes lie in the nanometer range in the receiver of the precipitate influences precipitation in such a way that the precipitated boehmitic alumina hydrates exhibit a pore volume of 1.0 to 2.5, in particular of 1.0 to 1.6 ml/g, and an average pore radius of 6 to 12 nm. This is made all the more remarkable by the fact that the inorganic particles used as the crystal nuclei themselves only exhibit a pore volume in the area of 0.5 ml/g.

The procedure according to the invention is characterized in that the precipitate comprised of aqueous solutions of an acidic aluminum salt and a basic aluminate solution in an aqueous receiver containing alumina hydrate and/or alumina, which exhibits average particle diameters in aqueous media of 12 to 250 nm, preferably 20 to 150 nm, and especially preferred 20 to 100 nm, or 0.1 to 5% w/w of organic polymers or oligomers relative to the precipitated alumina hydrates and computed as Al$_2$O$_3$, which exhibit particle sizes of 12 to 250 nm, and especially preferred 20 to 150 nm or 50 to 100 nm, or any mixtures of the lattices and alumina/alumina hydrate particles described above.

In the procedure according to the invention, alumina hydrates with a very high pore volume (as determined per DIN 66134) and an average pore radius of 6 to 12 nm (as determined per DIN 66134) are accessible at a crystallite size of 3 to 5 nm as determined via X-ray diffraction on a 120 reflex.

The procedure is preferably executed in such a way that
  the crystal nuclei are presented in an aqueous acidic solution, and
  one or more basic aluminum salts, e.g., alkaline or earth-alkaline aluminates and one or more acidic aluminum salts (including aluminum oxy salts), e.g., aluminum sulfate, aluminum nitrate, aluminum chloride, aluminum formate or aluminum oxy chloride or aluminum oxy nitrate, are added, preferably essentially together, or
  the basic aluminum compound is precipitated by adding an aqueous acid, or the acidic aluminum compound is precipitated by adding an aqueous base.

The crystal nuclei comprised of alumina hydrates and/or alumina, which in aqueous media exhibit average particle diameters of 12 to 250 nm, preferably 20 to 150 nm, and especially preferred 50 to 100 nm, themselves generally consist of agglomerates of crystallites, which preferably exhibit relatively high crystallite sizes exceeding 4 nm, preferably between 4 and 40 nm.

Precipitation preferably takes place from aqueous dispersions of alumina particles with the addition of 0.1 to 5% w/w of the inorganic crystal nuclei, preferably 0.5 to 2% w/w and especially preferred 1 to 1.5% w/w relative to the Al$_2$O$_3$ to be precipitated in all.

However, the precipitation can also take place from aqueous dispersions of organic compounds described above, which form lattices in the precipitation medium.

In terms of the invention, latex is a colloidal dispersion of organic polymers or oligomers in an aqueous medium. Suitable for the creation of lattices are polymers or oligomers that exhibit a carbon chain of more than 20, preferably more than 100 carbon atoms as the basic framework, and additionally are preferably fabricated out of monomer units containing at least one double bond, preferably a vinyl or acrylic double bond. These include the following polymers/oligomers: Polystyrene, polyacrylic acid, polymethacrylic acid and polyvinyl acetate, along with their copolymers and mixtures. Suitable compositions include those available from the company Neste Chemicals GmbH under the trade name Dilexo.

In this embodiment, the organic compounds are used in an amount of 0.1 to 5% w/w, preferably 0.5 to 2% w/w, and especially preferred 1 to 1.5% w/w, relative the total alumina hydrate to be precipitated (determined as $Al_2O_3$).

Precipitation takes place in an aqueous receiver that consists of a dispersion of inorganic or organic particles, or a mixture of an acidic aluminum salt and a dispersion of inorganic or organic particles. Precipitation preferably takes place at a temperature of 20 to 98° C., especially preferred 60 to 80° C. The bulk of the alumina hydrate is precipitated at a pH value of 5 to 9, especially preferred 6 to 8.

The alumina hydrates manufactured according to the invention exhibit a distinctly lower content of anionic (e.g., sulfate) and cationic (e.g., sodium) contaminants than conventionally fabricated ones.

Gibbsite, Nordstrandite, amorphous alumina, Bayerite and diaspore can be used as the crystal nuclei, with boehmitic and/or pseudo-boehmitic alumina being preferred.

The crystal nuclei that can be used according to the invention are accessible according to the procedure described in DE 38 23 895-C1 (U.S. Pat. No. 5,055,019 A), for example. In this procedure, boehmitic alumina with an average pore radius of 3 to 100 nm can be manufactured via the hydrothermal ageing of an alumina suspension obtained via the hydrolysis of aluminum alkoxides. Hydrothermal ageing causes the crystallite sizes to grow to up to 40 nm in the respective spatial directions. The pore volume of these boehmite aluminas ranges from 0.6 to 0.8 ml/g. However, a procedure according to DE 43 37 643-C1 is better suited for the manufacture of the crystal nuclei useable according to the invention. When using crystal nuclei fabricated according to this procedure, precipitation products with higher pore volumes are obtained. The disclosure in DE 43 37 643-C1 (U.S. Pat. No. 6,030,599) will hereby expressly be included in the contents of this application.

The organic compounds do not act as opening materials, which are known for the fabrication of ceramics. The organic compounds used according to the invention are added in small quantities relative to these applications, while the opening materials are added primarily in quantities exceeding 10% w/w. As opposed to the receiver of organic particles, the alumina hydrates according to this embodiment exhibit a higher content of anionic contaminants.

Alumina hydrates obtainable according to this procedure are preferably boehmitic or pseudo-boehmitic aluminas.

Experimental Section:

The crystallite sizes of the boehmitic aluminas were determined at 120 reflex using the general Scherrer formula:

Crystallite size=($K$×lambda×57.3)/(beta×cos theta)

K (form factor): 0.992; lambda (wavelength of X-ray radiation): 0.154 nm; beta (corrected industrial broadening of spectral lines): reflex-dependent; theta: reflex-dependent.

The measurements were performed on an X'pert-type XRD device made by Philips. Measuring parameters: start angle [2θ]: 5.010; end angle [°2θ]: 79.990; start d-value [Å]: 17.62435; end d-value [Å]: 1.19850; anode material: Cu; α1 wavelength [Å]: 1.54060; α2 wavelength [Å]: 1.54439.

The pore size distribution, overall pore volume and specific surface are determined via nitrogen adsorption according to DIN 66134 with a device from the Quantachrome company. The contaminants were determined via atomic emission spectroscopy with inductively coupled plasma (AES-ICF, SPECTRO company).

EXAMPLE 1

Comparison Example 31.6 kg of water were heated to 70° C. in a 350 l mixing vessel equipped with stirring system, heating jacket and pH measuring device. An aluminum sulfate solution was added (6.2% $Al_2O_3$) until a pH value of 3.5 was established. Mixing took place for 5 minutes under these conditions (62 RPM). Subsequently, the aluminum sulfate solution (2.16 l/h) and a sodium aluminate solution (21.1% $Al_2O_3$, 16.8 l/h) were simultaneously added while mixing to set a pH value of 7.3. The precipitated boehmitic alumina was filtered out, washed with fully desalinized water (50 g water/g alumina), and dried with a spray dryer (air outlet temperature 120° C.).

After activated for 3 h at 550° C., the product obtained according to the comparison example exhibits the pore size distribution indicated in Table 1, an overall pore volume (0 to 100 nm) of 0.89 ml/g, and a specific surface of 280 m²/g. In this case, the average pore radius measured 5.8 nm. The crystallite size determined on the 120 reflex measured 4 nm. Contaminants were determined via atomic emission spectroscopy with inductively coupled plasma (ABS-ICP, SPECTRO company). In this case, a Na content of 132 ppm and sulfate content of 0.12% was obtained at an $Al_2O_3$ content of 72.5%.

EXAMPLE 2

1.23 kg of a 65% nitric acid followed by 1.43 g of PURAL SB-1 (CONDEA) were mixed into 98.77 kg of water to manufacture an alumina sol. The average size of the alumina particles in the sol measures 65 nm.

To precipitate the boehmitic alumina, the alumina sol is heated to 70° C. The pH value is subsequently raised by adding sodium aluminate solution (21.1% $Al_2O_3$, 16.8 l/h) and set to 7.3 via the simultaneous addition of aluminum sulfate solution (6.2% $Al_2O_3$, 21.6 l/h). The precipitated boehmitic alumina was filtered off, washed with fully desalinized water (50 g water/g alumina), and dried with a spray dryer (air outlet temperature 120° C.).

The pore size distribution, overall pore volume, specific surface and contaminants were determined based on the method described in the experiment section. After activated for 3 h at 550° C., the product obtained according to Example 2 exhibits the pore size distribution indicated in Table 2, an overall pore volume (0 to 100 nm) of 1.55 ml/g, and a specific surface of 274 m²/g. In this case, the average pore radius measured around 12 nm. The crystallite size determined on the 120 reflex measured 4 nm, the Na content 58 ppm, and the sulfate content 504 ppm.

EXAMPLE 3

20 kg of glacial acetic acid followed by 1.43 kg of DISPERAL® sol P3 (CONDEA) were mixed into 80 kg of water to manufacture an alumina sol. The average size of the alumina particles in the sol measured 22 nm.

To precipitate the boehmitic alumina, the alumina sol was heated to 70° C. The pH value was subsequently raised by adding sodium aluminate solution (21.1% $Al_2O_3$, 16.8 l/h) and set to 7.3 via the simultaneous addition of aluminum sulfate solution (6.2% $Al_2O_3$, 21.6 l/h). The precipitated boehmitic alumina was filtered off, washed with fully desalinized water (50 g water/g alumina), and dried with a spray dryer (air outlet temperature 120° C.).

The pore size distribution, overall pore volume, specific surface and contaminants were determined based on the method described in the experiment section. After activated for 3 h at 550° C., the product obtained according to Example 3 exhibited an overall pore volume (0-100 nm) of 1.46 ml/g and a specific surface of 277 $m^2/g$. In this case, the average pore radius measured around 10 nm. The crystallite size determined on the 120 reflex measured 4 nm. The Na content measured 53 ppm, and the sulfate content 539 ppm.

EXAMPLE 4

1 kg of formic acid followed by 1.43 kg of CATAPAL A (CONDEA Vista) were mixed into 99 kg of water to manufacture an alumina sol. The average size of the alumina particles in the sol measured 90 nm.

To precipitate the boehmitic alumina, the alumina sol was heated to 70° C. The pH value was subsequently raised by adding sodium aluminate solution (21.1% $Al_2O_3$, 16.8 l/h) and set to 7.3 via the simultaneous addition of aluminum sulfate solution (6.2% $Al_2O_3$, 21.6 l/h). The precipitated boehmitic alumina is filtered off, washed with fully desalinized water (50 g water/g alumina), and dried with a spray dryer (air outlet temperature 120° C.).

The pore size distribution, overall pore volume, specific surface and contaminants are determined based on the method described in the experiment section. After activated for 3 h at 550° C., the product obtained according to Example 4 exhibits an overall pore volume (0-100 nm) of 1.25 ml/g and a specific surface of 277 $m^2/g$. In this case, the average pore radius measures around 11 nm. The crystallite size determined on the 120 reflex measured 4 nm, the Na content 126 ppm, and the sulfate content 464 ppm.

EXAMPLE 5

1.23 kg of 65% nitric acid followed by 1.43 kg of PURAL 200 (CONDEA) were mixed into 98.77 kg of water to manufacture an alumina sol. The average size of the alumina particles in the sol measures 240 nm.

To precipitate the boehmitic alumina, the alumina sol is heated to 70° C. The pH value is subsequently raised by adding sodium aluminate solution (21.1% $Al_2O_3$, 16.8 l/h) and set to 7.3 via the simultaneous addition of aluminum sulfate solution (6.2% $Al_2O_3$, 21.6 l/h). The precipitated boehmitic alumina is filtered off, washed with fully desalinized water (50 g water/g alumina), and dried with a spray dryer (air outlet temperature 120° C.).

The pore size distribution, overall pore volume, specific surface and contaminants were determined based on the method described in the experiment section. After activated for 3 h at 550° C., the product obtained according to Example 5 exhibits an overall pore volume (0-100 nm) of 0.98 ml/g and a specific surface of 279 $m^2/g$. In this case, the average pore radius measured around 7 nm. The crystallite size determined on the 120 reflex measured 4 nm, the Na content 42 ppm, and the sulfate content 0.1%.

The pore properties of the aluminas obtained according to examples 2 to 5 are summarized in Table 1 as a function of the average particle size in the prepared sol:

TABLE 1

| Average particle size | Pore volume | Average pore radius in sol (0-100 nm) |
| --- | --- | --- |
| 22 nm | 1.46 ml/g | 10 nm |
| 65 nm | 1.55 ml/g | 12 nm |
| 90 nm | 1.25 ml/g | 11 nm |
| 240 nm | 0.98 ml/g | 7 nm |

As evident, a maximal pore volume and a maximal average pore radius can be achieved in the area of a sol with a particle size of 65 nm in the aqueous receiver.

EXAMPLE 6

2.2 kg of a polymer dispersion consisting of acrylic acid and methacrylic acid (DILEXO MM 16, NESTE Chemicals GmbH, Düsseldorf) were mixed into 90 kg of water. The average particle size in the dispersion measured 39 nm.

To prepare the precipitate, the polymer dispersion was set to a pH of 3.5 by adding aluminum sulfate solution drop-by-drop and heated to 70° C. To precipitate the boehmitic alumina, the pH value was raised by adding sodium aluminate solution (21.1% $Al_2O_3$, 16.8 l/h) and set to 7.3 via the simultaneous addition of aluminum sulfate solution (6.2% $Al_2O_3$, 21.6 l/h). The precipitated boehmitic alumina was filtered off, washed with fully desalinized water (50 g water/g alumina), and dried with a spray dryer (air outlet temperature 120° C.).

The pore size distribution, overall pore volume, specific surface and contaminants were determined based on the method described in the experiment section. After activated for 3 h at 550° C., the product obtained according to Example 6 exhibited an overall pore volume (0-100 nm) of 1.20 ml/g and a specific surface of 325 $m^2/g$. In this case, the average pore radius measured around 7 nm. The crystallite size determined on the 120 reflex measured 4 nm, the Na content 94 ppm, and the sulfate content 1.0%.

EXAMPLE 7

2.2 kg of a polymer dispersion consisting of acrylic acid and methacrylic acid (DILEXO MM 16, NESTE Chemicals GmbH, Düsseldorf) were mixed into 90 kg of water. The average particle size in the dispersion measured 39 nm.

To prepare the precipitate, the polymer dispersion was set to a pH of 3.5 by adding aluminum sulfate solution drop-by-drop and heated to 70° C. To precipitate the boehmitic alumina, the pH value was lowered by adding aluminum sulfate solution (6.2% $Al_2O_3$, 21.6 l/h) and set to 7.3 via the simultaneous addition of sodium aluminate solution (21.1% $Al_2O_3$, 16.8 l/h). The precipitated boehmitic alumina was filtered off, washed with fully desalinized water (50 g water/g alumina), and dried with a spray dryer (air outlet temperature 120° C.).

The pore size distribution, overall pore volume, specific surface and contaminants were determined based on the method described in the experiment section.

After activated for 3 h at 550° C., the product obtained according to Example 7 exhibited an overall pore volume (0-100 nm) of 1.20 ml/g and a specific surface of 299 $m^2/g$. In this case, the average pore radius measured around 7 nm. The crystallite size determined on the 120 reflex measured 3 nm, the Na content 72 ppm, and the sulfate content 1.0%.

The alumina hydrates manufactured in examples 1 to 7 exhibit the pore radius distribution, pore volumes and pore surface exhibited in Table 2.

TABLE 2

| Example 1 Radius Å | Pore vol. [cc/g] | Example 2 Radius Å | Pore vol. [cc/g] | Example 3 Radius Å | Pore vol. [cc/g] |
| --- | --- | --- | --- | --- | --- |
| 11.53 | 0.00E+00 | 11.48 | 0.00E+00 | 11.6 | 0.00E+00 |
| 13.32 | 0.00E+00 | 13.25 | 0.00E+00 | 13.26 | 0.00E+00 |
| 14.09 | 0.00E+00 | 14.08 | 0.00E+00 | 14.02 | 0.00E+00 |
| 14.9 | 0.00E+00 | 14.77 | 0.00E+00 | 14.83 | 0.00E+00 |
| 15.72 | 0.00E+00 | 15.62 | 0.00E+00 | 15.68 | 0.00E+00 |
| 16.48 | 0.00E+00 | 16.52 | 0.00E+00 | 16.59 | 0.00E+00 |
| 17.45 | 0.00E+00 | 17.48 | 0.00E+00 | 17.55 | 0.00E+00 |
| 18.43 | 0.00E+00 | 18.46 | 0.00E+00 | 18.55 | 0.00E+00 |
| 19.45 | 0.00E+00 | 19.46 | 0.00E+00 | 19.52 | 0.00E+00 |
| 20.78 | 1.34E−03 | 20.74 | 0.00E+00 | 20.77 | 0.00E+00 |
| 22.22 | 4.86E−03 | 22.14 | 0.00E+00 | 22.09 | 0.00E+00 |
| 23.65 | 1.12E−02 | 23.68 | 0.00E+00 | 23.43 | 0.00E+00 |
| 25.2 | 2.43E−02 | 25.35 | 2.64E−04 | 25.16 | 0.00E+00 |
| 27.11 | 5.96E−02 | 27.03 | 1.71E−03 | 27.15 | 0.00E+00 |
| 29.3 | 1.30E−01 | 29.06 | 6.25E−03 | 29.27 | 3.95E−03 |
| 31.67 | 2.59E−01 | 31.45 | 1.18E−02 | 31.49 | 1.63E−02 |
| 34.34 | 4.18E−01 | 34.21 | 3.19E−02 | 34.07 | 5.28E−02 |
| 36.46 | 4.79E−01 | 36.3 | 3.97E−02 | 36.27 | 8.50E−02 |
| 37.78 | 5.25E−01 | 37.43 | 5.34E−02 | 37.66 | 1.17E−01 |
| 38.9 | 5.70E−01 | 38.94 | 7.13E−02 | 38.98 | 1.63E−01 |
| 40.32 | 6.11E−01 | 40.51 | 9.29E−02 | 40.55 | 2.27E−01 |
| 42.08 | 6.44E−01 | 42.04 | 1.21E−01 | 42.3 | 3.06E−01 |
| 43.85 | 6.69E−01 | 43.91 | 1.62E−01 | 43.92 | 3.62E−01 |
| 45.83 | 6.94E−01 | 45.89 | 2.02E−01 | 45.74 | 4.15E−01 |
| 47.8 | 7.09E−01 | 47.93 | 2.45E−01 | 47.95 | 4.87E−01 |
| 49.89 | 7.29E−01 | 50.24 | 3.06E−01 | 50.15 | 5.43E−01 |
| 52.56 | 7.52E−01 | 52.73 | 3.64E−01 | 52.48 | 6.07E−01 |
| 54.97 | 7.60E−01 | 55.27 | 4.19E−01 | 55.15 | 6.61E−01 |
| 57.35 | 7.76E−01 | 58.24 | 4.88E−01 | 58.31 | 7.25E−01 |
| 60.87 | 7.89E−01 | 61.61 | 5.42E−01 | 61.46 | 7.81E−01 |
| 64.24 | 7.97E−01 | 65.19 | 5.97E−01 | 65.02 | 8.42E−01 |
| 68.48 | 8.10E−01 | 69.45 | 6.70E−01 | 69.05 | 8.84E−01 |
| 73.65 | 8.17E−01 | 74.02 | 7.20E−01 | 73.86 | 9.35E−01 |
| 78.69 | 8.24E−01 | 79.49 | 7.77E−01 | 79.4 | 9.78E−01 |
| 84.41 | 8.30E−01 | 85.94 | 8.40E−01 | 85.09 | 1.02E+00 |
| 90.71 | 8.36E−01 | 92.9 | 8.95E−01 | 92.49 | 1.08E+00 |
| 98.16 | 8.42E−01 | 101.74 | 9.58E−01 | 101.15 | 1.12E+00 |
| 108.02 | 8.47E−01 | 112.74 | 1.02E−00 | 112.23 | 1.17E+00 |
| 120.49 | 8.52E−01 | 126.63 | 1.08E−00 | 125.42 | 1.20E+00 |
| 135.88 | 5.57E−01 | 143.35 | 1.14E−00 | 142.44 | 1.23E+00 |
| 155.57 | 8.62E−01 | 164.42 | 1.20E−00 | 168.89 | 1.26E+00 |
| 182.4 | 8.67E−01 | 195.37 | 1.26E−00 | 190.43 | 1.30E+00 |
| 223 | 8.72E−01 | 241.94 | 1.32E−00 | 231.5 | 1.33E+00 |
| 294.58 | 8.77E−01 | 323.12 | 1.39E−00 | 297.27 | 1.37E+00 |
| 420.95 | 8.83E−01 | 454.54 | 1.44E−00 | 432.76 | 1.42E+00 |
| 651.25 | 8.88E−01 | 809.41 | 1.52E−00 | 701.87 | 1.46E+00 |
| 1173.10 | 8.92E−01 | 1429.05 | 1.55E−00 | 1007.56 | 1.46E+00 |

| Example 4 Radius Å | Pore vol. [cc/g] | Example 5 Radius Å | Pore vol. [cc/g] |
| --- | --- | --- | --- |
| 11.42 | 0.00E+00 | 11.53 | 0.00E+00 |
| 13.1 | 2.03E−04 | 13.21 | 0.00E+00 |
| 13.84 | 4.84E−04 | 13.96 | 0.00E+00 |
| 14.62 | 8.55E−04 | 14.76 | 0.00E+00 |
| 15.45 | 8.55E−04 | 15.61 | 0.00E+00 |
| 16.34 | 1.43E−03 | 16.53 | 0.00E+00 |
| 17.29 | 1.99E−03 | 17.5 | 0.00E+00 |
| 18.31 | 2.76E−03 | 18.54 | 0.00E+00 |
| 19.42 | 3.66E−03 | 19.62 | 0.00E+00 |
| 20.62 | 4.66E−03 | 20.67 | 0.00E+00 |
| 21.95 | 5.28E−03 | 22.07 | 8.42E−04 |
| 23.43 | 7.13E−03 | 23.6 | 2.46E−03 |
| 25.05 | 9.32E−03 | 25.06 | 7.19E−03 |
| 26.81 | 1.20E−02 | 26.81 | 1.43E−02 |
| 28.6 | 1.44E−02 | 29.04 | 3.27E−02 |
| 31.07 | 2.13E−02 | 31.52 | 6.26E−02 |
| 33.73 | 2.74E−02 | 34.19 | 1.30E−01 |
| 35.5 | 3.11E−02 | 36.38 | 1.72E−01 |
| 36.86 | 3.62E−02 | 37.74 | 2.19E−01 |
| 38.27 | 4.16E−02 | 39.01 | 2.76E−01 |
| 39.8 | 4.70E−02 | 40.42 | 3.50E−01 |
| 41.38 | 5.4E−020 | 42.18 | 4.31E−01 |
| 42.86 | 6.07E−02 | 43.99 | 5.02E−01 |
| 45.02 | 7.54E−02 | 45.86 | 5.77E−01 |
| 47.43 | 8.54E−02 | 47.73 | 6.20E−01 |
| 49.24 | 9.49E−02 | 49.82 | 6.82E−01 |
| 51.54 | 1.15E−01 | 52.22 | 7.22E−01 |
| 54.56 | 1.35E−01 | 54.67 | 7.53E−01 |
| 57.72 | 1.60E−01 | 57.77 | 7.84E−01 |
| 60.69 | 1.83E−01 | 60.98 | 8.03E−01 |
| 64.47 | 2.22E−01 | 64.49 | 8.22E−01 |
| 68.87 | 2.59E−01 | 67.94 | 8.32E−01 |
| 73.48 | 3.17E−01 | 72.52 | 8.48E−01 |
| 78.91 | 3.69E−01 | 78.39 | 8.57E−01 |
| 85.69 | 4.43E−01 | 84.04 | 8.66E−01 |
| 93.44 | 5.16E−01 | 90.57 | 8.74E−01 |
| 102.31 | 6.05E−01 | 98.5 | 8.81E−01 |
| 112.48 | 6.82E−01 | 108.29 | 8.88E−01 |
| 125.17 | 7.70E−01 | 120.35 | 8.96E−01 |
| 141.76 | 8.55E−01 | 135.46 | 9.03E−01 |
| 161.22 | 9.36E−01 | 154.42 | 9.09E−01 |
| 190.61 | 1.03E+00 | 177.26 | 9.16E−01 |
| 232.53 | 1.09E+00 | 226.1 | 9.28E−01 |
| 294.97 | 1.15E+00 | 301.37 | 9.36E−01 |
| 440.19 | 1.20E+00 | 453.46 | 9.51E−01 |
| 767.58 | 1.23E+00 | 857.48 | 9.68E−01 |
| 1530.56 | 1.25E+00 | 1497.5 | 9.76E−01 |

| Example 6 Radius Å | Pore vol. [cc/g] | Example 7 Radius Å | Pore vol. [cc/g] |
| --- | --- | --- | --- |
| 11.64 | 00.00E+00 | 11.51 | 0.00E+00 |
| 13.34 | 00.00E+00 | 13.23 | 0.00E+00 |
| 14.11 | 00.00E+00 | 13.89 | 0.00E+00 |
| 14.95 | 00.00E+00 | 14.72 | 0.00E+00 |
| 15.81 | 00.00E+00 | 15.65 | 0.00E+00 |
| 16.7 | 00.00E+00 | 16.41 | 0.00E+00 |
| 17.6 | 00.00E+00 | 17.26 | 0.00E+00 |
| 18.61 | 00.00E+00 | 18.45 | 0.00E+00 |
| 19.71 | 5.42E−04 | 19.57 | 0.00E+00 |
| 20.96 | 2.71E−03 | 20.67 | 7.98E−05 |
| 22.33 | 8.35E−03 | 22.05 | 1.68E−03 |
| 23.72 | 1.95E−02 | 23.48 | 4.57E−03 |
| 25.38 | 4.11E−02 | 25.13 | 1.34E−02 |
| 27.22 | 7.72E−02 | 27.09 | 2.72E−02 |
| 29.29 | 1.37E−01 | 29.12 | 4.50E−02 |
| 31.68 | 2.49E−01 | 31.53 | 7.46E−02 |
| 34.38 | 4.03E−01 | 34.18 | 1.18E−01 |
| 36.44 | 4.65E−01 | 36.1 | 1.47E−01 |
| 37.77 | 5.25E−01 | 37.59 | 1.90E−01 |
| 39.13 | 5.73E−01 | 39.18 | 2.48E−01 |
| 40.59 | 6.18E−01 | 40.51 | 2.95E−01 |
| 42.22 | 6.52E−01 | 42.1 | 3.82E−01 |
| 43.92 | 6.85E−01 | 44.09 | 4.59E−01 |
| 45.83 | 7.13E−01 | 45.93 | 5.49E−01 |
| 47.88 | 7.37E−01 | 47.92 | 6.28E−01 |
| 50.2 | 7.61E−01 | 50.08 | 6.98E−01 |
| 52.61 | 7.82E−01 | 52.46 | 7.58E−01 |
| 55.02 | 8.02E−01 | 55.2 | 8.13E−01 |
| 57.99 | 8.25E−01 | 58.04 | 8.60E−01 |
| 61.48 | 8.45E−01 | 61 | 8.91E−01 |
| 64.97 | 8.66E−01 | 64.59 | 9.22E−01 |
| 69.06 | 8.91E−01 | 69.06 | 9.46E−01 |
| 74.04 | 9.18E−01 | 73.47 | 9.64E−01 |
| 79.61 | 9.49E−01 | 78.2 | 9.80E−01 |
| 85.86 | 9.79E−01 | 84.07 | 9.96E−01 |
| 93.22 | 1.02E+00 | 92.31 | 1.02E+00 |
| 102.36 | 1.05E+00 | 102.41 | 1.03E+00 |
| 113.32 | 1.07E+00 | 111.74 | 1.04E+00 |
| 125.91 | 1.09E+00 | 123.75 | 1.06E+00 |
| 141.67 | 1.11E+00 | 137.64 | 1.06E+00 |
| 164.7 | 1.12E+00 | 161.76 | 1.08E+00 |
| 193.16 | 1.14E+00 | 190.92 | 1.09E+00 |
| 238.94 | 1.15E+00 | 230.14 | 1.10E+00 |
| 307.19 | 1.17E+00 | 299.79 | 1.11E+00 |
| 447.68 | 1.18E+00 | 453.25 | 1.13E+00 |
| 698.1 | 1.19E+00 | 737.46 | 1.16E+00 |
| 1007.9 | 1.19E+00 | 1367.11 | 1.18E+00 |

The invention claimed is:

1. A procedure for manufacturing boehmite and/or pseudo-boehmite comprising:

precipitating boehmite and/or pseudo-boehmite from an aqueous medium containing crystal nuclei of alumina in the presence of a precipitating agent selected from the group consisting of basic aluminum salts, acidic aluminum salts and mixtures thereof, said nuclei being present in an amount of 0.1 to 5% w/w of said precipitated boehmite and/or pseudo-boehmite calculated as $Al_2O_3$, said crystal nuclei having an average diameter of 20 to 150 nm.

2. The procedure of claim 1, wherein said crystal nuclei are selected from the group consisting of boehmite, pseudo-boehmite and mixtures thereof.

3. A procedure according to claim 1, wherein the average diameter is from 50 to 100 nm.

4. A procedure according to claim 1, wherein crystal nuclei in an amount of 0.5 to 2% w/w relative to the precipitated boehmite and/or pseudo-boehmite and computed as $Al_2O_3$ are used for precipitation.

5. A procedure according to claim 1, wherein the crystal nuclei are present in an aqueous, acidic solution and at least one basic aluminum salt and at least one acidic aluminum salt are jointly added.

6. A procedure according to claim 1, characterized in that alkali aluminates, alkaline earth aluminates or aluminum hydroxy salts are used as the basic aluminum salts.

7. A procedure according to claim 1, characterized in that aluminum sulfate, aluminum nitrate, aluminum chloride or aluminum formate are used as the acidic aluminum salts.

8. A procedure according to claim 1, characterized in that the bulk of the boehmite and/or pseudo-boehmite is precipitated at a pH value of 5 to 9.

9. A procedure according to claim 8 wherein the pH value is from 6 to 8.

10. A procedure according to claim 1, wherein the crystal nuclei are prepared in an aqueous, acidic solution and at least one basic aluminum salt and at least one acidic aluminum salt are jointly added.

11. A procedure for manufacturing boehmite and/or pseudo boehmite comprising:

precipitating boehmite and/or pseudo-boehmite from an aqueous medium containing an organic polymer/oligomer which form lattices in said aqueous medium, in the presence of a compound selected from the group consisting of basic aluminum salts, acidic aluminum salts and mixtures thereof, said polymer/oligomer being present in an amount of 0.1 to 5% w/w of the precipitated boehmite and/or pseudo-boehmite, calculated as $Al_2O_3$, said polymer/oligomer having an average diameter of 12 to 250 nm and being selected from the group consisting of polyacrylic acids, polymethacrylic acids, polyacrylates, polystyrenes, polyvinylacetates, polyvinylversalates, their co-polymers and mixtures thereof.

* * * * *